United States Patent
Kim et al.

(10) Patent No.: US 12,313,942 B2
(45) Date of Patent: May 27, 2025

(54) OPTICAL LAMINATE AND MANUFACTURING METHOD THEREFOR, SMART WINDOW COMPRISING SAME, AND VEHICLE AND BUILDING WINDOWS AND DOORS TO WHICH SAME ARE APPLIED

(71) Applicant: DONGWOO FINE-CHEM CO., LTD., Iksan-si (KR)

(72) Inventors: Dong-Hwi Kim, Sejong (KR); Geo-San Lim, Seoul (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/577,923

(22) PCT Filed: Jul. 4, 2022

(86) PCT No.: PCT/KR2022/009598
§ 371 (c)(1),
(2) Date: Jan. 9, 2024

(87) PCT Pub. No.: WO2023/287090
PCT Pub. Date: Jan. 19, 2023

(65) Prior Publication Data
US 2024/0319548 A1    Sep. 26, 2024

(30) Foreign Application Priority Data
Jul. 13, 2021    (KR) .................. 10-2021-0091642

(51) Int. Cl.
*G02F 1/1343*    (2006.01)
*B60J 3/04*    (2006.01)
(Continued)

(52) U.S. Cl.
CPC ............ *G02F 1/13439* (2013.01); *B60J 3/04* (2013.01); *E06B 9/24* (2013.01);
(Continued)

(58) Field of Classification Search
None
See application file for complete search history.

(56) References Cited

U.S. PATENT DOCUMENTS

| | | | |
|---|---|---|---|
| 2002/0114054 A1* | 8/2002 | Rietjens | G02B 1/14 |
| | | | 359/241 |
| 2014/0055723 A1* | 2/2014 | Du | G02B 5/201 |
| | | | 359/487.01 |

(Continued)

FOREIGN PATENT DOCUMENTS

| | | |
|---|---|---|
| EP | 0 887 692 B1 | 8/2005 |
| JP | 2018-010035 A | 1/2018 |

(Continued)

OTHER PUBLICATIONS

Extended European search report issued on Sep. 27, 2024, in counterpart European Patent Application No. 22842352.1 (10 pages).

*Primary Examiner* — Ryan Crockett
(74) *Attorney, Agent, or Firm* — NSIP Law

(57) ABSTRACT

The present invention relates to a variable transmittance optical laminate and a manufacturing method therefor, a smart window comprising same, and vehicle and building windows and doors to which same is applied, the variable transmittance optical laminate comprising: a first polarizing plate; a first transparent conductive layer formed on the inner surface of the first polarizing plate; a second polarizing plate facing the first polarizing plate; a second transparent conductive layer which is formed on the inner surface of the second polarizing plate and which faces the first transparent conductive layer; a liquid crystal layer provided between the first transparent conductive layer and the second transparent conductive layer; and an alignment film formed on the inner surface of the transparent conductive layer.

18 Claims, 5 Drawing Sheets

(51) Int. Cl.
*E06B 9/24* (2006.01)
*G02F 1/1335* (2006.01)
*G02F 1/1337* (2006.01)

(52) U.S. Cl.
CPC ...... *G02F 1/133528* (2013.01); *G02F 1/1337* (2013.01); *E06B 2009/2464* (2013.01)

(56) References Cited

U.S. PATENT DOCUMENTS

| | | | |
|---|---|---|---|
| 2015/0370382 | A1 | 12/2015 | Hsu et al. |
| 2016/0238771 | A1 | 8/2016 | Lee et al. |
| 2016/0291357 | A1* | 10/2016 | Min ..................... G02B 5/3016 |
| 2019/0383973 | A1* | 12/2019 | Jang ..................... G06F 1/1652 |
| 2022/0299690 | A1* | 9/2022 | Gim ..................... G02B 5/305 |

FOREIGN PATENT DOCUMENTS

| | | |
|---|---|---|
| KR | 10-2010-0060025 A | 6/2010 |
| KR | 10-2012-0067324 A | 6/2012 |
| KR | 10-2014-0026291 A | 3/2014 |
| KR | 10-2015-0105266 A | 9/2015 |
| KR | 10-2018-0084775 A | 7/2018 |
| KR | 10-2018-0097415 A | 8/2018 |
| KR | 10-2019-0096444 A | 8/2019 |
| KR | 10-2021-0049688 A | 5/2021 |

* cited by examiner ized plate; a first transparent conductive layer formed on an inner surface of the first polarizing plate; a second polarizing plate opposing the first polarizing plate; a second transparent conductive layer formed on an inner surface of the second polarizing plate, and opposing the first transparent conductive layer; a liquid crystal layer provided between the first transparent conductive layer and the second transparent conductive layer; and an alignment film formed on an inner surface of each of the transparent conductive layers, wherein at least one transparent conductive layer of the first transparent conductive layer and the second transparent conductive layer is formed by directly contacting with the first polarizing plate or the second polarizing plate, at least one polarizing plate of the first polarizing plate and the second polarizing plate includes a polarizer and a coating layer provided between the polarizer and at least one of the transparent conductive layers, and the coating layer includes nanoparticles.

OPTICAL LAMINATE AND MANUFACTURING METHOD THEREFOR, SMART WINDOW COMPRISING SAME, AND VEHICLE AND BUILDING WINDOWS AND DOORS TO WHICH SAME ARE APPLIED

CROSS REFERENCE TO RELATED APPLICATIONS

This application is a U.S. National Stage Application of International Application No. PCT/KR2022/009598, filed on Jul. 4, 2022, which claims the benefit under 35 USC 119(a) and 365(b) of Korean Patent Application No. 10-2021-0091642, filed on Jul. 13, 2021, in the Korean Intellectual Property Office, the entire disclosure of which is incorporated herein by reference for all purposes.

TECHNICAL FIELD

The present disclosure relates to a variable transmittance optical stack, a manufacturing method therefor, a smart window including the same, and windows and doors for a vehicle and a building, to which the same is applied.

BACKGROUND ART

In general, there are many cases in which an external light blocking coating is applied to a window of a means of transportation such as a vehicle. However, a transmittance of a conventional window of a means of transportation is fixed, and a transmittance of the external light blocking coating is also fixed. Therefore, the entire transmittance of the conventional window of the means of transportation is fixed, thereby causing an accident. For example, when the entire transmittance is preset low, there is no problem during day when ambient light is sufficient. However, there is a problem in that it is difficult for a driver or the like to properly check the surroundings of the means of transportation at night when ambient light is insufficient. Alternatively, when the entire transmittance is preset high, there is a problem of causing glare to a driver or the like during day when ambient light is sufficient. Accordingly, a variable transmittance optical stack capable of changing a transmittance of light when a voltage is applied has been developed.

The variable transmittance optical stack is driven by changing the transmittance by driving liquid crystal according to application of voltage. The variable transmittance optical stack developed so far is manufactured by patterning a conductive layer for driving liquid crystal on a separate or additional substrate, and then combining the conductive layer with other elements such as a polarizing plate.

For example, Japanese Patent Publication Application No. 2018-010035 discloses a variable transmittance optical stack formed by bonding a transparent electrode layer formed on a transparent film-shaped substrate having a predetermined thickness, with a polarizing plate.

However, when a separate or additional substrate is included to form the conductive layer as described above, as a manufacturing process becomes complicated, manufacturing costs is increased, the thickness of the stack is increased, and the transmittance is changed due to occurrence of phase difference.

Accordingly, there is a need to develop a variable transmittance optical stack capable of simplifying a manufacturing process, reducing the thickness by not including a separate or additional substrate for forming a conductive layer.

DISCLOSURE

Technical Problem

The present disclosure is intended to provide a variable transmittance optical stack having a simplified manufactured process by not including a separate or additional substrate for forming a conductive layer.

Another objective of the present disclosure is to provide a variable transmittance optical stack in which the thickness is significantly reduced by not including a separate or additional substrate for forming a conductive layer.

Yet another objective of the present disclosure is to provide a variable transmittance optical stack in which a transmittance in a light transmissive mode thereof is improved by not including a separate or additional substrate for forming a conductive layer.

Still another objective of the present disclosure is to improve adhesion between a polarizing plate and a conductive layer by having a coating layer including nanoparticles between a polarizer and the conductive layer.

Still another objective of the present disclosure is to provide a smart window including a variable transmittance optical stack, and windows and doors for a vehicle or a building, to which the same is applied.

However, the problem to be solved by the present disclosure is not limited to the problems mentioned above, and other problems not mentioned will be clearly understood by those skilled in the art from the description below.

Technical Solution

According to the present disclosure, there is provided variable transmittance optical stack including: a first polar- In the first aspect of the present disclosure, the nanoparticles may include silica particles.

In the second aspect of the present disclosure, the nanoparticles may have particle diameters less than or equal to 50 nm.

In the third aspect of the present disclosure, the coating layer may have a thickness ranging from 3 to 10 μm.

In the fourth aspect of the present disclosure, at least one transparent conductive layer of the first transparent conductive layer and the second transparent conductive layer may be formed by directly contacting with the first polarizing plate or the second polarizing plate without a separate or additional substrate between the polarizing plate and transparent conductive layer.

In the fifth aspect of the present disclosure, at least one transparent conductive layer of the first transparent conductive layer and the second transparent conductive layer may be formed by directly contacting with the first polarizing plate or the second polarizing plate, with a highly adhesive layer the polarizing plate and the transparent conductive layer.

In the sixth aspect of the present disclosure, at least one transparent conductive layer of the first transparent conductive layer and the second transparent conductive layer may include one or more types selected from a group consisting of transparent conductive oxide, metal, carbonaceous materials, conductive polymers, conductive ink, and nanowires.

In the seventh aspect of the present disclosure, at least one transparent conductive layer of the first transparent conductive layer and the second transparent conductive layer may have a transmittance of equal to or greater than 50% for visible light.

In the eighth aspect of the present disclosure, at least one polarizing plate of the first polarizing plate and the second polarizing plate may include at least one of a protective film and an optical functional film.

In the ninth aspect of the present disclosure, the protective film may include one or more types selected from a group consisting of polyethylene terephthalate, polyethylene isophthalate, polyethylene naphthalate, polybutylene terephthalate, diacetyl cellulose, triacetyl, polycarbonate, polymethyl acrylate, polymethyl methacrylate, polyethyl acrylate, polyethyl methacrylate, and cyclic olefin polymer.

In the tenth aspect of the present disclosure, at least one polarizing plate of the first polarizing plate and the second polarizing plate may have a thickness ranging from 30 μm to 200 μm.

In the eleventh aspect of the present disclosure, the liquid crystal layer may include one or more types selected from a group consisting of a ball spacer and a column spacer.

In the twelfth aspect of the present disclosure, the ball spacer may have a diameter ranging from 1 μm to 10 μm.

In the thirteenth aspect of the present disclosure, an occupancy area of the ball spacer in the liquid crystal layer may range from 0.01% to 10% of the area of the liquid crystal layer.

In the fourteenth aspect of the present disclosure, the variable transmittance optical stack may include a refractive index-matching layer having a refractive index ranging from 1.4 to 2.6.

Furthermore, the present disclosure relates to a manufacturing method for a variable transmittance optical stack.

Furthermore, the present disclosure relates to a smart window including a variable transmittance optical stack.

Furthermore, the present disclosure relates to a vehicle in which a smart window is applied to at least one of a front window, a rear window, a side window, a sunroof window, and an inner partition thereof.

Furthermore, the present disclosure relates to building windows and doors including a smart window.

Advantageous Effects

Furthermore, the variable transmittance optical stack according to the present disclosure is configured to omit the process of forming a conductive layer on a separate or additional substrate and bonding the conductive layer and other members for forming the conventional optical stack, so that the manufacturing process thereof can be simplified in comparison to the conventional optical stack.

The variable transmittance optical stack according to the present disclosure does not include a separate or additional substrate for forming the conductive layer as the conductive layer is directly formed on one surface of the polarizing plate, so that the thickness thereof may be significantly reduced in comparison to the thickness of the conventional optical stack.

The variable transmittance optical stack according to the present disclosure does not include a separate or additional substrate for forming the conductive layer as the conductive layer is directly formed on one surface of the polarizing plate, so that a transmittance in the light transmissive mode may be improved in comparison to the thickness of the conventional optical stack.

Furthermore, according to the present disclosure, the variable transmittance optical stack includes the coating layer containing nanoparticles between the polarizer and the conductive layer, so that the polarizer can be protected and adhesion between the polarizing plate and the conductive layer can be further improved.

BEST MODE

Figure 1:
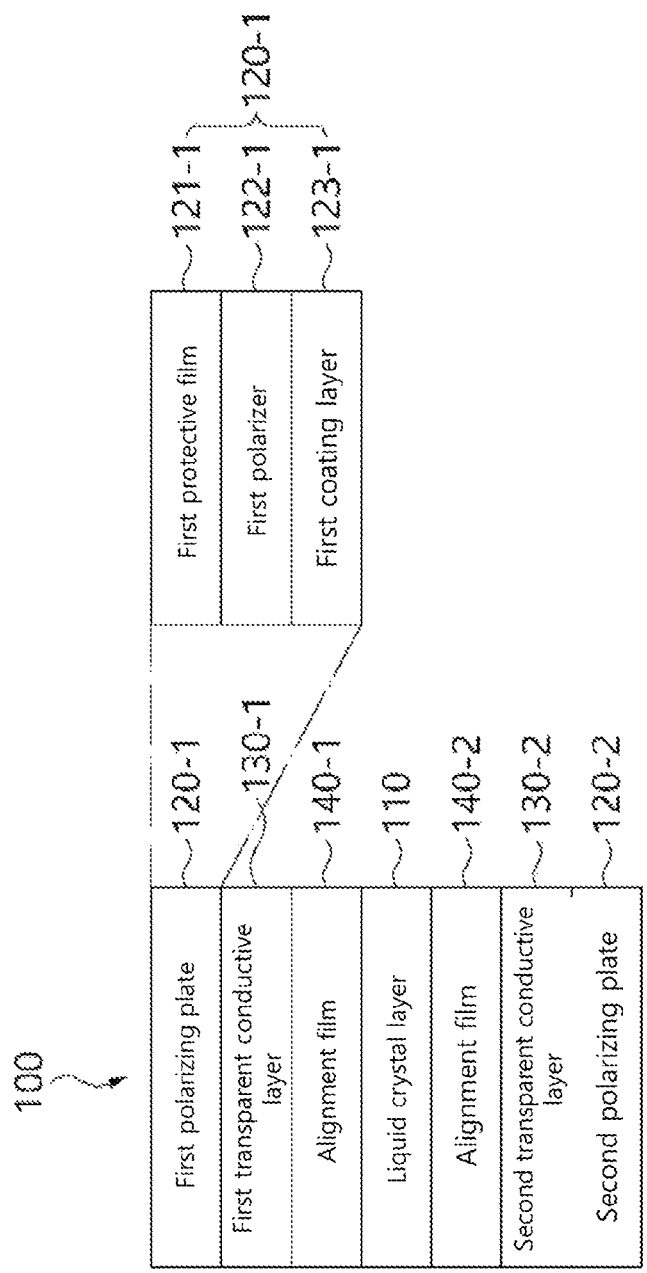
FIG. 1 is a view showing a stack structure of a variable transmittance optical stack according to an embodiment of the present disclosure.

The present disclosure relates to a variable transmittance optical stack, wherein the variable transmittance optical stack does not include a separate or additional substrate for forming a conductive layer by directly forming the conductive layer for driving liquid crystal on one surface of a polarizing plate, and the variable transmittance optical stack is capable of improving adhesion between the polarizing plate and the conductive layer the polarizer by including a coating layer containing nanoparticles between a polarizer and the conductive layer.

More specifically, the variable transmittance optical stack includes: a first polarizing plate; a first transparent conductive layer formed on an inner surface of the first polarizing plate; a second polarizing plate opposing the first polarizing plate; a second transparent conductive layer formed on an inner surface of the second polarizing plate, and opposing the first transparent conductive layer; a liquid crystal layer provided between the first transparent conductive layer and the second transparent conductive layer; and an alignment film formed on an inner surface of each of the transparent conductive layers. At least one transparent conductive layer of the first transparent conductive layer and the second transparent conductive layer is formed by directly contacting with the first polarizing plate or the second polarizing plate, at least one polarizing plate of the first polarizing plate and the second polarizing plate includes a polarizer and a coating layer provided between the polarizer and at least one of the transparent conductive layers, and the coating layer includes nanoparticles.

The variable transmittance optical stack of the present disclosure is particularly suitable for technical fields where a light transmittance can be changed in response to application of voltage, for example, may be used for a smart window.

The smart window is a window controlling the amount of light or heat passing through the window by changing a light transmittance in response to an electrical signal. In other words, the smart window is provided to be changed into a transparent, opaque or translucent state by voltage and is called variable transmittance glass, lighting control glass, or smart glass.

The smart window may be used as partitions for partitioning an internal space of vehicles and buildings or for protecting privacy, or as skylights arranged in openings of buildings, and may be used as highway signs, noticeboards, scoreboards, clocks or advertising screens, and may be used to replace glass of a means of transportation, such as windows or sunroof windows of cars, buses, aircrafts, ships, or trains.

The variable transmittance optical stack of the present disclosure may also be used for the smart window of the various technical fields mentioned above, but since the transparent conductive layer is directly formed in the polarizing plate, there is no need to include a separate or additional substrate for forming the transparent conductive layer and the thickness thereof is thin and is advantageous in the flexuosity, so the optical stack of the present disclosure may be used to be particularly suitable for a smart window of a vehicle or a building. According to one or a plurality of embodiments, the smart window to which the variable transmittance optical stack of the present disclosure is applied may be used for front windows, rear windows, side windows, and sunroof windows of a vehicle, or windows and doors for a building, and the smart window may be used to not only an external light blocking use, but also an internal space partitioning use or a privacy protecting use such as an inner partition for a vehicle or a building.

Hereinbelow, embodiments of the present disclosure will be described in detail with reference to drawings. However, the following drawings accompanied to this specification illustrate preferred embodiments of the present disclosure, and serve to further understand the technical idea of the present disclosure with the contents of the above-described invention. Therefore, the present disclosure should not be construed as being limited to materials described in the drawings.

Terms used in this specification are selected to describe embodiments and thus do not limit the present disclosure. In this specification, an element expressed in a singular form may be plural elements unless it is necessarily singular in the context.

As used herein, terms "comprise" and/or "comprising" do not mean exclusion of the presence or absence of one or more components, steps, movements and/or elements other than a component, a step, movement, and/or an element mentioned above. The same reference numerals are used throughout the specification to designate the same or similar elements.

In the specification, "the inner surface" may be referred to as a surface in a direction of an inner layer corresponding to an outer layer of the stack, and as an example, may be referred to as a surface in a direction of the liquid crystal layer, but is not limited thereto.

Spatially relative terms "below", "lower surface", and "lower portion", and "above", "upper surface", and "upper portion" may be used to easily describe correlation between "one element or components" and "another element or other components", as shown in drawings. The spatially relative terms should be understood as terms including different directions of an element when being used or operated in addition to a direction shown in the drawings. For example, when an element shown in the drawings is turned over, the element described as being "below" or "lower" with respect to another element may be placed "on" the another element. Accordingly, the exemplary term "below" may include both downward and upward directions. An element may be aligned in a different direction, and accordingly, the spatially relative terms may be interpreted according to orientation.

Figure 2:
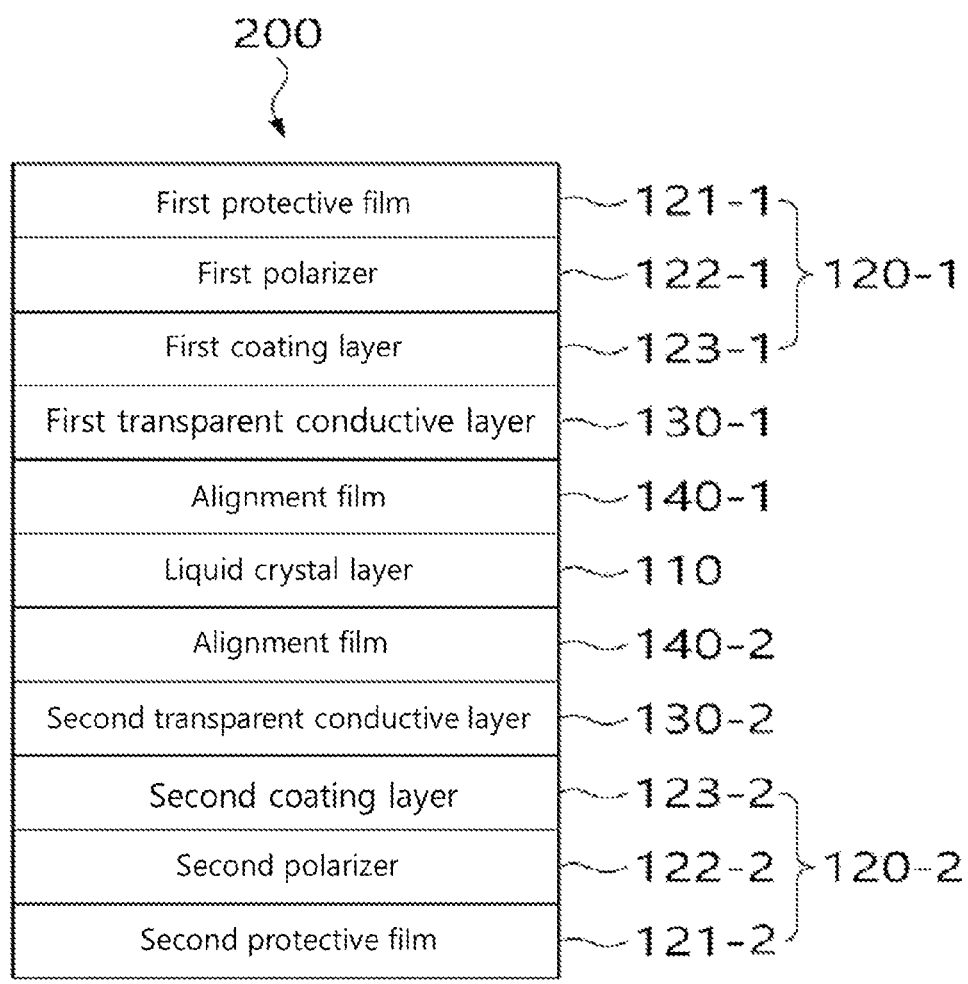
FIG. 2 is a view showing a stack structure in an exploded state of the variable transmittance optical stack according to the embodiment of the present disclosure.

FIG. 1 is a view showing a stack structure of a variable transmittance optical stack according to an embodiment of the present disclosure. FIG. 2 is a view showing an unfolded stack structure of the variable transmittance optical stack according to the embodiment of the present disclosure.

Referring to FIGS. 1 and 2, according to the embodiment of the present disclosure, the variable transmittance optical stack 100, 200 may include a liquid crystal layer 110, a first polarizing plate 120-1, a second polarizing plate 120-2, a first transparent conductive layer 130-1, a second transparent conductive layer 130-2, and an alignment film 140-1, 140-2. The first polarizing plate 120-1 may include a first protective film 121-1, a first polarizer 122-1, and a first coating layer 123-1. Furthermore, the second polarizing plate 120-2 may include a protective film 121-2, a polarizer 122-2, and a coating layer 123-2, like the first polarizing plate 120-1.

The liquid crystal layer 110 is characterized to be driven in response to an electric field. The liquid crystal layer 110 may be located between the first polarizing plate and the second polarizing plate that are located in a light control region of the optical stack 100. According to the embodiment, the liquid crystal layer 110 may be located in a space provided by a sealant (not shown) and a spacer (not shown) provided between the first polarizing plate 120-1 and the second polarizing plate 120-2 in the light control region. Furthermore, the liquid crystal layer 110 may adjust a transmittance of light incident from an external light source in response to an electric field formed between the first transparent conductive layer 130-1 and the second transparent conductive layer 130-2.

The liquid crystal layer 110 may be driven in a liquid crystal driving method currently developed or to be developed and, for example, a twisted nematic (TN) mode, a super twisted nematic (STN) mode, etc.

According to another embodiment of the present disclosure, the liquid crystal layer 110 may include one or more types of spacers selected from a group consisting of a ball spacer and a column spacer, and specifically, it is preferable that the included spacer is a ball spacer. The ball spacer may include one or more ball spacers, and preferably has a diameter ranging from 1 to 10 μm. Furthermore, when viewed in a planar direction, a region where the ball spacer is occupied in the liquid crystal layer 110 (i.e., light control region) preferably ranges from 0.01 to 10% of the area of the liquid crystal layer 110 in an aspect of improvement of user's visibility and a transmittance in a light transmissive mode.

The first polarizing plate 120-1 and the second polarizing plate 120-2 may be located with the liquid crystal layer 110 located therebetween to face each other with opposite surfaces thereof. The first polarizing plate 120-1 and the second polarizing plate 120-2 may transmit sporadically incident in one direction, and may regulate the amount of light passing through the polarizing plate 120 by using polarization properties thereof to adjust a transmittance of the optical stack.

The first polarizing plate 120-1 may include the first protective film 121-1, the first polarizer 122-1, and the first coating layer 123-1 and, for example, the first coating layer 123-1, the first polarizer 122-1, and the first protective film 121-1 may be successively stacked on an upper surface of the first transparent conductive layer 130-1. The second polarizing plate 120-2 may be substantially same as the first polarizing plate 120-1 and, for example, the second coating layer 123-2, the second polarizer 122-2, and the second protective film 121-2 may be successively stacked on a lower surface of the second transparent conductive layer 130-2.

The protective film 121-1, 121-2 may be provided to protect the polarizer 122-1, 122-2, the coating layer 123-1, 123-2, etc. from post protecting and external environment.

As shown in FIGS. 1 and 2, the protective film 121-1, 121-2 may be formed by directly contacting with one surface of the polarizer 122-1, 122-2, but is not limited thereto. For example, the protective layer may be used as a double layer structure in which one or more protective layers are successively stacked, and may be formed on an upper surface of another member.

According to one or a plurality of embodiments, the protective film 121-1, 121-2 may include one or more types selected from a group consisting of polyester resin such as polyethylene terephthalate (PET), polyethylene isophthalate (PEI), polyethylene naphthalate (PEN), polybutylene terephthalate (PBT), etc.; cellulose resin such as diacetyl cellulose, triacetyl cellulose (TAC), etc.; polycarbonate (PC) resin; polyethylene (PE) resin; polypropylene (PP) resin; acrylic resin such as polymethyl acrylate (PMA), polymethyl methacrylate (PMMA), polyethyl acrylate (PEA), polyethyl methacrylate (PEMA), etc.; and cyclic olefin polymer (COP).

According to another embodiment of the present disclosure, the optical stack may include an optical functional film. The optical functional film may be provided to complement optical properties of the optical stack, and may be implemented in a retardation film, and a retardation film currently developed or to be developed may be used therefor. For example, a quarter-wave plate (¼ wave plat) or a half-wave plate (½ wave plat) may be used to delay a phase difference (retardation) of light, and may be used alone or in combination.

The optical functional film may be formed by directly contacting with one surface of the polarizer, but is not limited thereto and, for example, may be a stack of the polarizer, the protective film, and the optical functional film that are successively stacked.

The optical functional film may be a polymer stretched film or a liquid crystal polymerized film, formed by stretching a polymer film that can impart optical anisotropy by stretching in an appropriate manner.

According to the embodiment, the polymer stretched film may use a polymer layer including: polyolefin such as polyethylene (PE) or polypropylene (PP), etc.; cyclo olefin polymer (COP) such as polynorbornene, etc.; polyester such as polyvinyl chloride (PVC), polyacrylonitrile (PAN), polysulfone (PSU), acryl resin, polycarbonate (PC), polyethylene terephthalate (PET), etc.; and/or cellulose ester polymer such as polyacrylate, polyvinyl alcohol (PVA), triacetyl cellulose (TAC), etc., or a copolymer of two or more monomers among monomers that can form the polymers.

An obtaining method of the polymer stretched film is not particularly limited and, for example, may be obtained by forming the polymer material into a film shape and then stretching the material. The molding method for the film shape is not particularly limited, and the polymer stretched film may be formed in the known methods such as injection molding, sheet molding, blow molding, injection blow molding, inflation molding, extrusion molding, foaming molding, cast molding, etc., and may be formed in a secondary processing molding method such as pressure molding, vacuum molding, etc. Among them, extrusion molding and cast molding may be preferably used. At this point, for example, an unstretched film may be extruded by using an extruder to which a T-die, a circular die, etc., may be mounted. When a molded product is obtained in extrusion molding, a material made by melt-kneading various resin components, additives, etc., in advance, may be used and the molded product may be formed by melt-kneading during extrusion molding. Furthermore, various resin components are dissolved by using common solvent, for example, solvent such as chloroform, 2 methylene chloride, and then is solidified in a cast dry manner, thereby cast-molding the non-stretched film.

The polymer stretched film may be provided by performing uniaxial stretching with respect to the molded film in a mechanical direction (MD, longitudinal or length direction), and by performing uniaxial stretching in a direction (TD, transverse direction or width direction) perpendicular to the MD, and furthermore, a biaxial stretched film may be manufactured by performing stretching in a sequential biaxial stretching method of roll stretching and tenter stretching, a simultaneous biaxial stretching method of tenter stretching, a biaxial stretching method of tubular stretching, etc.

The liquid crystal polymerized film may contain reactive liquid crystal compound in a polymerized state. The reactive liquid crystal compound may mean a compound, for example, containing a mesogen frame, etc., and also containing one or more polymerizable functional groups. The reactive liquid crystal compound may be variously known by the name reactive mesogen (RM). The reactive liquid crystal compound may constitute a cured film with polymer network formed while being polymerized by light or heat and maintaining liquid crystal arrangement.

The reactive liquid crystal compound may be a mono-functional liquid crystal compound or a multi-functional liquid crystal compound. The mono-functional liquid crystal compound is a compound having 1 polymerizable functional group, and the multi-functional liquid crystal compound may mean a compound having two or more polymerizable functional groups.

In one or a plurality of embodiments, the thickness of the optical functional film may be a thickness ranging from 10 µm to 100 µm in the polymer stretched film, and may be a thickness ranging from 0.1 µm to 5 µm in the liquid crystal polymerized film.

At least one polarizing plate of the first polarizing plate 120-1 and the second polarizing plate 120-2 may use a polarizer currently developed or to be developed and, for example, a stretched polarizer or a coated polarizer may be used therefor.

According to an embodiment, the stretched polarizer may include a stretched polyvinyl alcohol (PVA)-based resin. The PVA-based resin may be PVA-based resin obtained by saponifying polyvinyl acetate resin. In addition to polyvinyl acetate that is homopolymer of vinyl acetate, vinyl acetate and a copolymer with other monomers that can be copolymerized with vinyl acetate may be used as the polyvinyl acetate-based resin. As the other monomers, unsaturated carboxylic acid-based monomers, unsaturated sulfonic acid-based monomers, olefin-based monomers, vinyl ether-based monomers, acrylamide having ammonium group-based monomers, and the like may be used. Furthermore, the PVA-based resin includes a denatured resin and, for example, may be polyvinyl formal or polyvinyl acetal denatured into aldehyde.

According to an embodiment, the coated polarizer may be formed of a composition for liquid crystal coating, and, at this point, the composition for liquid crystal coating may contain reactive liquid crystal compound, and dichroic dye.

The description of the reactive liquid crystal compound of the optical functional film described above may be equally applied to the reactive liquid crystal compound.

The dichroic dye is a substance contained in the composition for liquid crystal coating to impart the polarization characteristic, and has a property in which absorbance in a direction of long axis of molecule and absorbance in a direction of short axis. The dichroic dye may be a dichroic dye currently developed or to be developed. For example, the dichroic dye may contain acridine dye, oxazine dye, cyanin dye, naphthalene dye, azo dye, anthraquinone dye, etc., and these may be used alone or in combination.

The composition for liquid crystal coating may contain a solvent capable of dissolving the reactive liquid crystal compound and the dichroic dye. For example, propylene glycol monomethyl ether acetate (PGMEA), methyl ethyl ketone (MEK), xylene, chloroform, and the like may be used. Furthermore, the composition for liquid crystal coating may contain leveling agents, polymerization initiators, etc. within a range that does not deteriorate the polarization characteristic of a coating film.

The coating layer may have an elasticity rate equal to or higher than 10 MPa and, more particularly, may have an elasticity rate of 10 to 104 MPa. When the elasticity rate of the coating layer meets the above range, the coating layer may have excellent adhesion and flexuosity.

According to the embodiment, the coating layer may be formed by the photocurable coating layer forming composition including a photopolymerizable compound and a photopolymerization initiator.

The photopolymerizable compound is not particularly limited as long as it imparts the range of the elasticity rate to the coating layer and, for example, may use acryl-based monomers, epoxy-based monomers, vinyl ether-based monomers, oxetane-based monomers, etc., and preferably in terms of the elasticity rate, may use epoxy-based monomers, vinyl ether-based monomers, and oxetane-based monomers. These monomers may be used alone or in combination of two or more types.

The acryl-based monomers, for example, may be methyl (meth) acrylate, ethyl (meth) acrylate, n-propyl (meth) acrylate, n-butyl (meth) acrylate, isobutyl (meth) acrylate, tert-butyl (meth) acrylate, (meth) acrylate, cyclohexyl (meth) acrylate, 2-ethylhexyl (meth) acrylate, lauryl (meth) acrylate, (meth) acrylate, 2-methoxyethyl (meth) acrylate, (meth) acrylate, 2-hydroxyethyl (meth) acrylate, 2-hydroxypropyl (meth) acrylate, 2-hydroxybutyl (meth) acrylate, 4-hydroxybutyl (meth) acrylate, glycerol mono (meth) acrylate, 3-chloro-2-hydroxypropyl (meth) acrylate, 2-hydroxy-3-phenoxypropyl (meth) acrylate, ethyleneglycoldi (meth) acrylate, diethyleneglycoldi (meth) acrylate, triethyleneglycoldi (meth) acrylate, butyleneglycoldi (meth) acrylate, nonaethyleneglycoldi (meth) acrylate, polypropyleneglycoldi (meth) acrylate, dipropyleneglycoldi (meth) acrylate, neopentylglycoldi (meth) acrylate, 1,3-butanedioldi (meth) acrylate, 1,4-butanedioldi (meth) acrylate, 1,6-hexanedioldi (meth) acrylate, trimethylolpropanetri (meth) acrylate, neopentylglycoldi (meth) acrylate, pentaerythritoltri (meth) acrylate, trimethylolmethanetri (meth) acrylate, isobornyl (meth) acrylate, N-vinylpyrrolidone, acryloylmorpholine, urethane(meth) acrylate, tetrahydrofurfuryl (meth) acrylate, (meth) acrylate of mono ε-caprolactone addition of tetrahydrofurfuryl alcohol, (meth) acrylate of di ε-caprolactone addition of tetrahydrofurfuryl alcohol, (meth) acrylate of mono β-methyl-δ-valerolactone addition of tetrahydrofurfuryl alcohol, (meth) acrylate of di β-methyl-δ-valerolactone addition of tetrahydrofurfuryl alcohol, ω-carboxy-polycaprolactonemonoacrylate dimethylaminoethyl acrylate, etc. These monomers may be used alone or in combination of two or more types.

The epoxy-based monomers may be aromatic epoxy compounds, cycloaliphatic epoxy compounds, aliphatic epoxy compounds, etc.

The aromatic epoxy compounds may be for example diglycidylether of bisphenol A, diglycidylether of bisphenol F, phenoxy glycerylether, etc.

The cycloaliphatic epoxy compounds may be for example dicyclopentadienedioxide, limonene dioxide, 4-vinylcyclohexene dioxide, 3,4-epoxycyclohexylmethyl, 3,4-epoxycyclohexanecarboxylate, bis(3,4-epoxycyclohexylmethyl)adipate, etc.

The aliphatic epoxy compounds may be for example 1,6-hexanedioldiglycidylether, 1,4-butanedioldiglycidylether, pentaerythritoltetraglycidylether, trimethylolpropanetriglycidylether, Polytetramethyleneglycoldiglycidylether, etc.

The vinyl ether-based monomers may be for example diethyleneglycoldivinylether, triethyleneglycoldivinylether, cyclohexyl vinylether, polyethyleneglycoldivinylether, 1,4-cyclohexanedimethanoldivinylether, etc. These monomers may be used alone or in combination of two or more types.

The oxetane-based monomers may include, for example, 2-ethylhexyloxetane, xylylenebisoxetane, 3-ethyl-3-hydroxymethyloxetane, 1,4-bis[(3-ethyloxetane-3-1)methoxymethyl]benzene, 3-ethyl-3-(2-ethylhexyloxymethyl)oxetane, bis(3-ethyl-3-oxetanylmethyl) ether, 3-ethyl-3-(phenoxymethyl)oxetane, 3-ethyl-3-(cyclohexyloxymethyl)oxetane, phenolnovolakoxetane, 1,3-bis[(3-ethyloxetan-3-yl)methoxy]benzene, etc. These monomers may be used alone or in combination of two or more types.

The photopolymerization initiators may be a cationic initiator and a radical initiator commonly used in the art, and the cationic initiator may, for example, be an onium salt compound, an iron-arene complex, etc.

The onium salt compound may, for example, be aromatic diazonium salts such as benzenediazonium hexafluoroantimonate, benzenediazonium hexafluorophosphate, benzenediazonium hexafluoroborate, etc.; aromatic iodonium salts such as diphenyliodonium tetrakis(pentafluorophenyl)borate, diphenyliodonium hexafluorophosphate, diphenyliodonium hexafluoroantimonate, di(4-nonylphenyl) iodonium hexafluorophosphate, etc.; and aromatic sulfonium salts such as triphenylsulfonium hexafluorophosphate, triphenylsulfonium hexafluoroantimonate, triphenylsulfonium tetrakis(pentafluorophenyl)borate, Diphenyl[4-(phenylthio) phenyl]sulfonium hexafluoroane thymonate, 4,4'-bis[diphenylsulfonio]diphenylsulfidebishexafluorophosphate, 4,4'-bis[di(β-hydroxyethoxy)phenylsulfonio]

diphenylsulfidebishexafluoroantimonate, 4,4'-bis[di(β-hydroxyethoxy)phenylsulfonio] diphenylsulfidebishexafluorophosphate, 7-[di(p-toluyl)sulfonio]-2-isopropylthioxanthone hexafluoroane thymonate, 7-[di(p-toluyl)sulfonio]-2-isopropylthioxanthone tetrakis(pentafluorophenyl)borate, 4-phenyl carbonyl-4'-diphenylsulfonio-diphenylsulfidehexafluorophosphate, 4-(p-tert-butylphenylcarbonyl)-4'-diphenylsulfonio-diphenylsulfidehexafluoroantimonate, 4-(p-tert-butylphenylcarbonyl)-4'-di(p-toluyl)sulfonio-diphenylsulfide tetrakis(pentafluorophenyl)borate, phosphate of diphenyl[4-(phenylthio)phenyl]sulfonium, etc.

The iron-arene complex may, for example, be xylene-cyclopentadienyl iron(II)hexafluoroantimonate, cumene-cyclopentadienyliron(II)hexafluorophosphate, xylene-cyclopentadienyliron(II)-tris(trifluoromethylsulfonyl)methanide, etc.

The radical initiator may be acetophenone-based, benzoin-based, benzophenone-based, thioxanthone-based, triazine-based compounds, etc. These monomers may be used alone or in combination of two or more types.

The acetophenone-based compound may, for example, diethoxyacetophenone, 2-hydroxy-2-methyl-1-phenylpropan-1-one, benzyldimethylketal, 2-hydroxy-2-methyl-1-[2-(2-hydroxyethoxy)phenyl]propan-1-on, 1-hydroxycyclohexyl phenyl ketone, 2-methyl-2-morpholino-1-(4-methylthiophenyl)propan-1-on, oligomers of 2-benzyl-2-dimethylamino-1-(4-morpholinophenyl)butan-1-on and 2-hydroxy2-methyl-1-[4-(1-methylvinyl)phenyl]propan-1-one, etc.

The benzoin-based compound may, for example, be benzoin, benzoin methyl ether, benzoin ethyl ether, benzoin isopropyl ether, benzoin isobutyl ether, etc.

The benzophenone-based compound may, for example, be benzophenone, methyl o-benzoyl benzoate, 4-phenylbenzophenone, 4-benzoyl-4'-methyldiphenyl sulfide, 3,3',4,4'-tetra(t-butylperoxycarbonyl)benzophenone, 2,4,6-trimethylbenzophenone, etc.

The thioxanthone-based compound may, for example, be 2-isopropylthioxanthone, 4-isopropylthioxanthone, 2,4-diethylthioxanthone, 2,4-dichlorothioxanthone, 1-chloro-4-propoxythioxanthone, etc.

The triazine-based compound may, for example, be 2,4-bis(trichloromethyl)-6-(4-methoxyphenyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, 2,4-bis(trichloromethyl)-6-[2-(3,4-dimethoxyphenyl)ethenyl]-1,3,5-triazine, etc.

The content of the photopolymerization initiator is not particularly limited. For example, the content of the photopolymerization initiator may be included, for example, as 0.1 to 10 of weight relative to 100 of weight of the photopolymerizable compound. When the content is within the above range, the initiator can be cured to an appropriate level to form the coating layer exhibiting the above elastic modulus range.

According to one or a plurality of embodiments, the thickness of the coating layer may be a value ranging from 3 to 10 μm and, more preferably, may be a value ranging from 3 to 7 μm. When the thickness of the coating layer is less than 3 μm, cohesion and elastic modulus of the coating layer may be reduced or it is difficult to develop adhesion. In particular, adhesion between the polarizer and the coating layer is reduced, and the function of protecting the polarizer may be reduced. Furthermore, when the thickness of the coating layer is greater than 10 μm, phase difference is generated and transmittance control is not efficiently performed. In particular, adhesion between the conductive layer and the coating layer is reduced and formation of the conductive layer may be not efficiently performed.

According to an embodiment, the coating layer may include nanoparticles in order to increase hardness and adhesion of the coating layer.

The nanoparticles may increase hardness and adhesion of the coating layer to facilitate formation of the conductive layer on the polarizing plate, and is not limited as long as it can stabilize the formed conductive layer and, for example, may include silica particles.

According to one or a plurality of embodiments, each of the nanoparticles may have a particle diameter less than or equal to 50 nm and, preferably, may have a particle diameter ranging from 10 to 50 nm. When a particle diameter of each of the nanoparticles is greater than 50 nm, light leakage may occur in the optical stack due to polarization breakdown, and light blocking performance in a light blocking mode may be reduced.

According to an embodiment, the nanoparticles may be dispersed in an organic solvent and may exist as a colloidal particle dispersion. The organic solvent may be appropriately selected within the range that does not impair the purpose of the present disclosure. For example, the organic solvent may be alcohols such as methanol, ethanol, and isopropanol, ketones such as methyl ethyl ketone and methyl isobutyl ketone, etc. The content of nanoparticles included in the nanoparticle dispersion is not particularly limited, but, may be included as 10 to 60% by weight based on the total weight of the dispersion.

The nanoparticle dispersion may be manufactured by a method commonly used in the industry, and commercially available products may be purchased and used. The commercial products are not particularly limited as long as they can achieve the purpose of the present disclosure. For example, the commercial products may be "MA-ST (Nissan Chemicals, particle size 10 to 15 nm)", "MA-ST-M (Nissan Chemicals, particle size 20 to 25 nm)", "MA-ST-L (Nissan Chemicals, particle size 40 to 50 nm)", ""IPA-ST (Nissan Chemicals, particle size 10 to 15 nm)", "IPA-ST-L (Nissan Chemicals, particle size 45 to 50 nm)", "IPA-ST-ZL (Nissan Chemicals, particle size 70 to 100 nm)", "IPA-ST-UP (Nissan Chemicals, particle size 9~15 nm), etc. These may be used individually or in combination of two or more.

The nanoparticle dispersion may have 10 to 80% by weight based on the total weight of composition for forming the coating layer and, preferably, may have 40 to 75% by weight and, more preferably, may have 50 to 70% by weight. When the content of the dispersion of the nanoparticles satisfies the above range, hardness, adhesion, and a transmittance of the coating layer can be improved.

According to an embodiment, at least one polarizing plate of the first polarizing plate 120-1 and the second polarizing plate 120-2 may have the thickness ranging from 30 to 200 μm and, preferably, may have the thickness ranging from 30 to 170 μm and, more preferably, may have the thickness ranging from 50 to 150 μm. In this case, while at least one polarizing plate of the first polarizing plate 120-1 and the second polarizing plate 120-2 maintains the optical characteristic, the optical stack having a thin thickness can be manufactured.

At least one polarizing plate of the first polarizing plate 120-1 and the second polarizing plate 120-2 may have an incurvate shape in order to manufacture the optical stack having a curved surface, and for example, may be formed to be curved towards either of two different polarizing plates 120-1 and 120-2 that are stacked on both surfaces of the liquid crystal layer 110.

The transparent conductive layer 130-1, 130-2 may include the first transparent conductive layer 130-1 provided on one surface of the first polarizing plate 120-1 and the second transparent conductive layer 130-2 provided on one surface of the second polarizing plate 120-2.

At least one transparent conductive layer of the first transparent conductive layer 130-1 and the second transparent conductive layer 130-2 may be formed by directly contacting with at least one polarizing plate of the first polarizing plate 120-1 and the second polarizing plate 120-2 and, for example, the first transparent conductive layer 130-1 may be formed by directly contacting with the first polarizing plate 120-1, and/or the second transparent conductive layer 130-2 may be formed by directly contacting with the second polarizing plate 120-2.

According to an embodiment, the first transparent conductive layer 130-1 and/or the second transparent conductive layer 130-2 formed by directly contacting with at least one polarizing plate of the first polarizing plate 120-1 and/or the second polarizing plate 120-2 may mean formation thereof on the polarizing plate without a separate or additional substrate, while sharing a contact surface with at least one polarizing plate of the first polarizing plate 120-1 and/or the second polarizing plate 120-2. For example, the first transparent conductive layer 130-1 and/or the second transparent conductive layer 130-2 may be formed by being deposited on an upper surface of the coating layer formed on the first polarizing plate 120-1 and/or the second polarizing plate 120-2. At this point, in order to increase the adhesion with respect to at least one polarizing plate of the first polarizing plate 120-1 and the second polarizing plate 120-2, the first transparent conductive layer 130-1 and/or the second transparent conductive layer 130-2 may be formed by going through pre-processing such as corona processing or plasma processing on one surface of the polarizing plate, and then directly contacting with the surface of the polarizing plate to which the pre-processing is performed. The pre-processing is not limited to the corona processing or the plasma processing, and may be pre-processing currently developed or to be developed without harming the purpose of the present disclosure.

According to another embodiment of the present disclosure, the first transparent conductive layer 130-1 and/or the second transparent conductive layer 130-2 formed by directly contacting with at least one polarizing plate of the first polarizing plate 120-1 and the second polarizing plate 120-2 may be formed by directly contacting with the polarizing plate while a highly adhesive layer (not shown in the drawing) provided at one surface of the polarizing plate being located therebetween, in order to increase adhesion with respect to the polarizing plate.

At least one transparent conductive layer of the first transparent conductive layer 130-1 and the second transparent conductive layer 130-2 preferably have a transmittance of 50% or more for visible light, and for example, may include one or more types selected from a group consisting of transparent conductive oxide, metal, a carbonaceous material, conductive polymer, conductive ink, and nanowires, but the present disclosure is not limited thereto, and a material of a transparent conductive layer currently developed or to be developed may be used.

According to one or a plurality of embodiments, the transparent conductive oxide may include one or more types selected from a group consisting of indium tin oxide (ITO), indium zinc oxide (IZO), indium zinc tin oxide (IZTO), aluminum zinc oxide (AZO), gallium zinc oxide (GZO), florin tin oxide (FTO), zinc oxide (ZnO), etc. Furthermore, the metal may include one or more types selected from a group consisting of aurum (Au), argentum (Ag), cuprum (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), alloy containing at least one of them, etc., and for example, may include argentum-palladium-cuprum (APC) alloy or cuprum-calcium (CuCa) alloy. The carbonaceous material may include one or more types selected from a group consisting of carbon nanotube (CNT), graphene, etc., and the conductive polymer may include one or more types selected from a group consisting of polypyrrole, polythiophene, polyacetylene, PEDOT, polyaniline, etc. The conductive ink may be a mixture of metal powder and curable polymer binder, and the nanowires may be for example silver nanowires (AgNW).

Furthermore, at least one transparent conductive layer of the first transparent conductive layer 130-1 and the second transparent conductive layer 130-2 may be formed in a structure of two or more layers in combination of the above-described substances. For example, in order to reduce the reflectance of incident light and increase the transmittance, the transparent conductive layer 130 may be formed in a structure of two layers including a metal layer and a transparent conductive oxide.

The alignment film 140-1, 140-2 may be formed on an inner surface of the transparent conductive layer. Specifically, the alignment film 140-1, 140-2 may be formed on an inner surface of at least one transparent conductive layer of the first transparent conductive layer 130-1 and the second transparent conductive layer 130-2. Preferably, the alignment film 140-1, 140-2 may be formed on an inner surface of each of the first transparent conductive layer 130-1 and the second transparent conductive layer 130-2.

To add orientation to the liquid crystal compound included in the liquid crystal layer 110, for example, the alignment film 140-1, 140-2 may be formed on both surfaces of the liquid crystal layer 110.

The alignment film 140-1, 140-2 may be manufactured by a method for manufacturing an alignment film currently developed or to be developed. For example, can be produced by applying and curing an alignment film coating composition containing an alignment polymer, a photopolymerization initiator, and a solvent. Although the aligned polymer is not particularly limited, the aligned polymer may be polyacrylate-based resin, polyamic resin, polyimide-based resin, polymer having cinnamate groups, etc. and may use polymer capable of expressing orientation, the polymer may be currently developed or to be developed.

Figure 3:
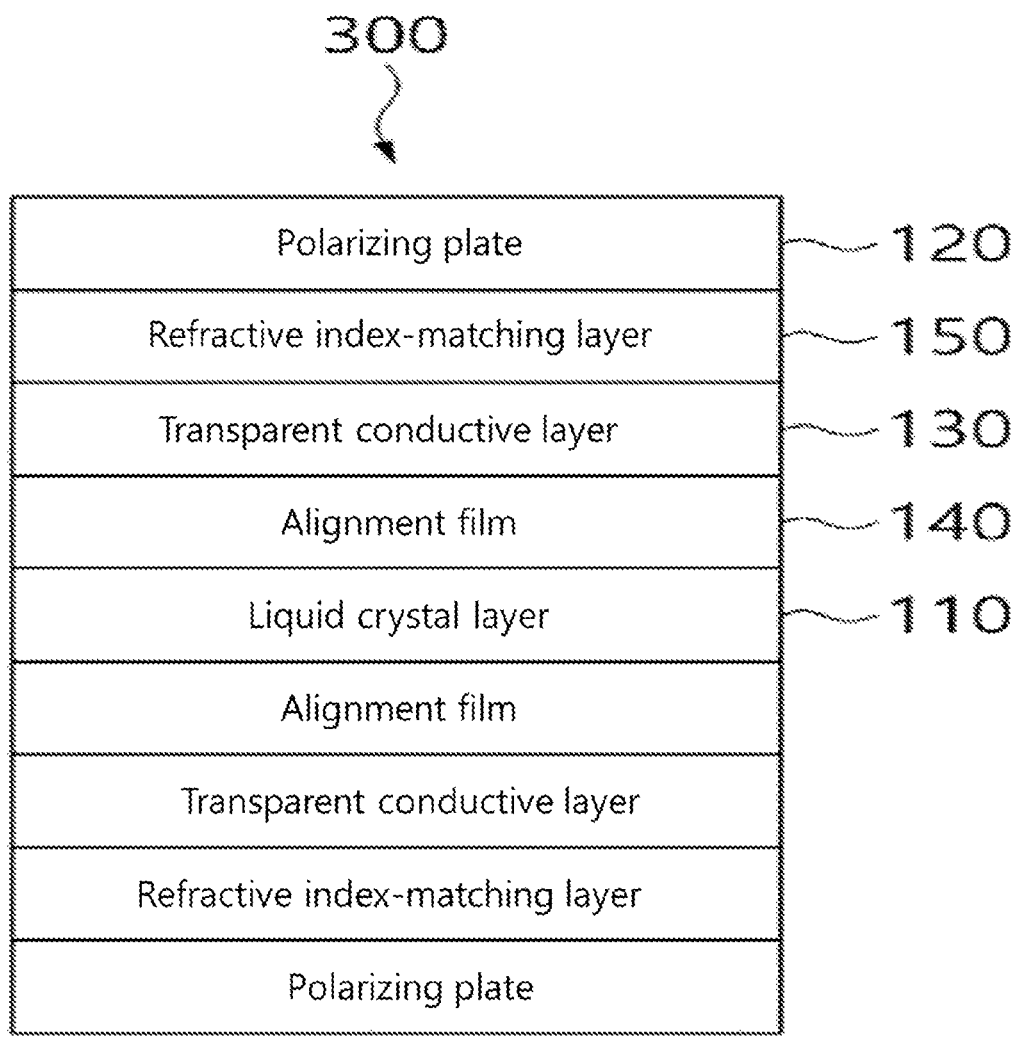
FIG. 3 is a stack structure of a variable transmittance optical stack including a refractive index-matching layer according to another embodiment of the present disclosure.

FIG. 3 is a stack structure of a variable transmittance optical stack including a refractive index-matching layer according another embodiment of the present disclosure.

Referring to FIG. 3, according to another embodiment of the present disclosure, the variable transmittance optical stack 300 may include the liquid crystal layer 110, the polarizing plate 120, the transparent conductive layer 130, the alignment film 140, and the refractive index-matching layer 150.

The refractive index-matching layer 150 is provided to compensate for the transmittance difference of the optical stack by the transparent conductive layer 130, and may serve to improve the visible characteristic by reducing the difference of the refractive index. Furthermore, the refractive index-matching layer 150 may be provided to correct a color based on the transparent conductive layer 130. Meanwhile, when the transparent conductive layer 130 has a pattern, the refractive index-matching layer 150 may correct the transmittance difference of a region with the pattern and a non-pattern region without the pattern.

Specifically, the transparent conductive layer 130 may be stacked close to another member having different refractive index (e.g., the polarizing plate 120, etc.), and difference of the refractive index between the layers may cause difference in transmittance. Specifically, when the pattern is formed in the transparent conductive layer 130, there may be a problem in that the pattern region and the non-pattern region are visually distinguished. Therefore, the refractive index-matching layer 150 is located between each polarizing plate 120 and the transparent conductive layer 130 to compensate for refractive index so as to reduce the difference in transmittance of the optical stack. Specifically, when a pattern is formed on the transparent conductive layer 130, the pattern region and the non-pattern region should be provided so as not to be visually distinguished.

The refractive index of the refractive index-matching layer 150 may be preset to be greater than the refractive index of the coating layer of the polarizing plate 120, and to be less than or equal to the refractive index of the transparent conductive layer 130. The refractive index may be properly selected depending on materials of the polarizing plate 120 and the transparent conductive layer 130, but it is preferable that refractive index may range from 1.4 to 2.6, and more preferably may range from 1.4 to 2.4. When the refractive index of the refractive index-matching layer 150 meets the above-described range, optical loss due to sharp difference between the polarizing plate 120 and the transparent conductive layer 130 can be prevented.

The refractive index-matching layer 150 is not particularly limited as long as it can prevent the sharply refractive index difference between the polarizing plate 120 and the transparent conductive layer 130, and a compound used in the formation of refractive index-matching layers currently developed or to be developed can be used. For example, the refractive index-matching layer 150 may be formed from refractive index-matching layer formation composition including polymerizable isocyanate compound.

Figure 4:
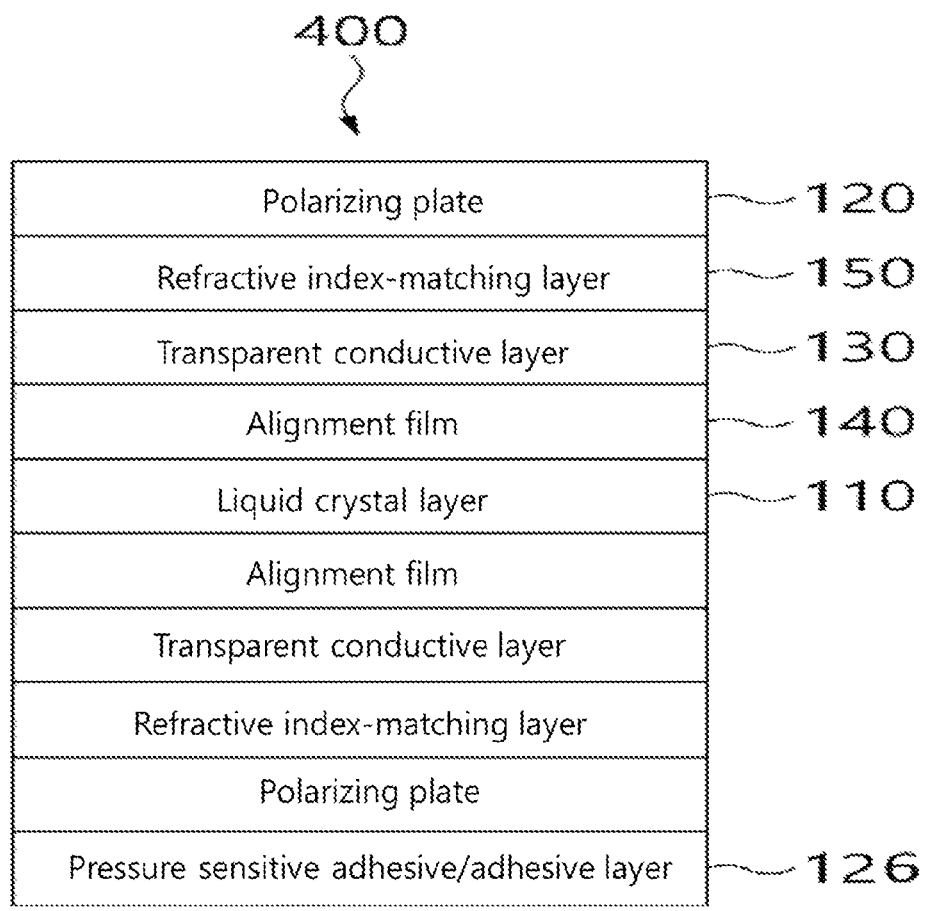
FIG. 4 is a view showing a stack structure of a variable transmittance optical stack in which a pressure sensitive adhesive/adhesive is formed on one surface thereof according to another embodiment of the present disclosure.

FIG. 4 is a view showing a stack structure of a variable transmittance optical stack in which a pressure sensitive adhesive/adhesive according to another embodiment of the present disclosure is formed on one surface thereof.

Referring to FIG. 4, according to another embodiment of the present disclosure, the variable transmittance optical stack 400 may include a pressure sensitive adhesive/adhesive layer 126 on one surface thereof.

The pressure sensitive adhesive/adhesive layer 126 may be formed using an adhesive or a pressure sensitive adhesive, and have appropriate pressure sensitive adhesion/adhesion to prevent peeling, bubbles, etc. from occurring when handling the optical stack 400, and preferably have transparency and thermal stability.

The adhesive may be an adhesive currently developed or to be developed, for example, may use photocurable adhesive.

The photocurable adhesive provides strong adhesion by being crosslinked and cured by receiving active energy rays such as ultraviolet (UV), electron beam (EB), etc., and may be composed of reactive oligomers, reactive monomers, photopolymerization initiators, and the like.

The reactive oligomers are important components that determine the properties of adhesive, and form polymer binding by photopolymerization to form a cured film. For example, the available oligomers may be polyester-based resin, polyether-based resin, polyurethane-based resin, epoxy-based resin, polyacryl-based resin, silicon-based resin, and the like.

The reactive monomers may serve as crosslinker, diluent of the reactive oligomers described above, and affect adhesion characteristics. For example, the available reactive monomers may be monofunctional monomers, multifunctional monomers, epoxy-based monomers, vinyl ethers, cyclic ethers, and the like.

The photopolymerization initiator may absorb light energy to generate radicals or cations to initiate photopolymerization, and a proper type may be selected and used depending on photopolymerization resin.

The pressure sensitive adhesive may use a pressure sensitive adhesive currently developed or to be developed. According to one or a plurality of embodiments, as the pressure sensitive adhesive, acrylic-based pressure sensitive adhesive, rubber-based pressure sensitive adhesive, silicon-based pressure sensitive adhesive, urethane-based pressure sensitive adhesive, polyvinyl alcohol-based pressure sensitive adhesive, polyvinyl pyrrolidone-based pressure sensitive adhesive, polyacrylamide-based pressure sensitive adhesive, cellulose-based pressure sensitive adhesive, vinylalkyl ether-based pressure sensitive adhesive and the like. The pressure sensitive adhesive is not particularly limited as long as it has pressure sensitive adhesion and viscoelasticity. In an aspect of ease of acquisition, preferably, the pressure sensitive adhesive may include acrylic-based pressure sensitive adhesive, for example, may be (meth) acrylate copolymers, crosslinkers, solvents, and the like.

The crosslinkers may be crosslinkers currently developed or to be developed and, for example, polyisocyanate compounds, epoxy resins, melamine resins, urea resins, dialdehydes, methylol polymers, etc., and may preferably include polyisocyanate compounds.

The solvents may include common solvents used in the field of resin compositions. For example, the solvents may use solvents such as: alcohol-based compounds such as methanol, ethanol, isopropanol, butanol, propylene glycol methoxy alcohol, and the like; ketone-based compounds such as methyl ethyl ketone, methyl butyl ketone, methyl isobutyl ketone, diethyl ketone, dipropyl ketone, and the like; acetate-based compounds such as methyl acetate, ethyl acetate, butyl acetate, propylene glycol methoxy acetate, and the like; cellosolve-based compounds such as methyl cellosolve, ethyl cellosolve, propyl cellosolve, etc.; hydrocarbon-based compounds such as hexane, heptane, benzene, toluene, xylene, and the like. The solvents may be used alone or combination of two or more types.

The thickness of the pressure sensitive adhesive/adhesive layer may be appropriately determined depending on a type of resins serving as the pressure sensitive adhesive/adhesive, the strength of the pressure sensitive adhesive/adhesive, the environment where the pressure sensitive adhesive/adhesive is used, and the like. According to an embodiment, the pressure sensitive adhesive/adhesive layer may have a thickness ranging from 0.01 μm to 50 μm in order to ensure sufficient adhesion and minimize the thickness of the optical stack and, preferably, may have a thickness ranging from 0.05 μm to 20 μm and, more preferably, may have a thickness ranging from 0.1 μm to 10 μm.

Figure 5:
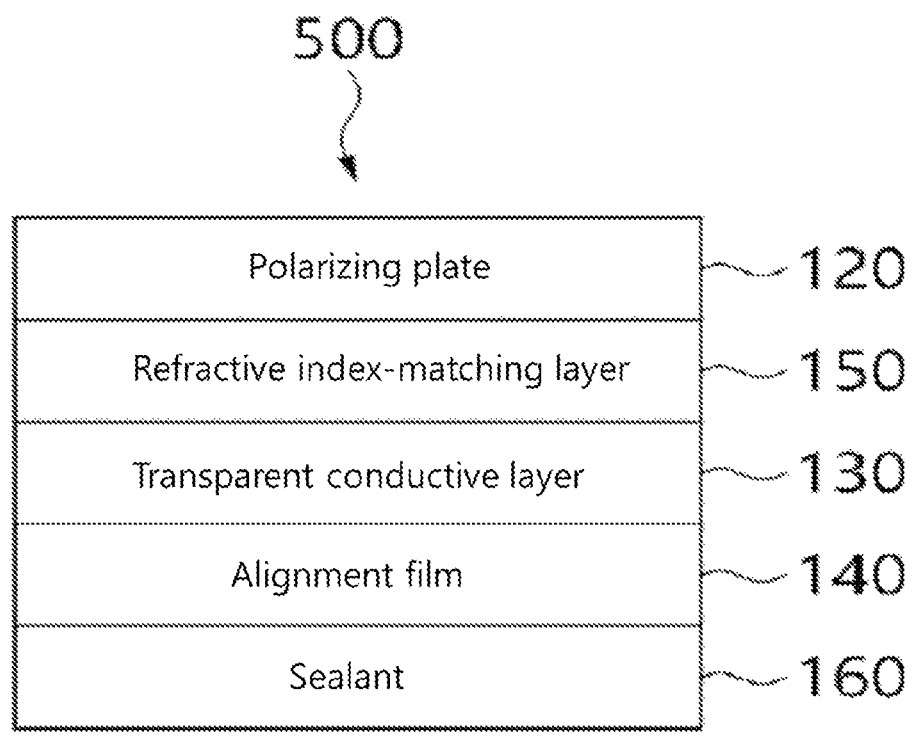
FIG. 5 is a view showing a stack structure of a variable transmittance optical stack in which a sealant is provided according to another embodiment of the present disclosure.

FIG. 5 is a view showing a stack structure of a variable transmittance optical stack in which a sealant is provided according to another embodiment of the present disclosure.

Referring to FIG. 5, according to another embodiment of the present disclosure, the variable transmittance optical stack 500 may include a sealant 160 provided an outer portion of the liquid crystal layer (not shown). The sealant is provided to couple the two different polarizing plates to each other, and may be located at an inactivate region, between the two different polarizing plates. Furthermore, the sealant may secure a space where the liquid crystal layer is provided between the two different polarizing plates with the spacer.

The sealant may include curable resins as base resins. As the base resins, UV curable resins or heat curable resins that are known to be usable for sealants in the art may be used. The ultraviolet curable resins may be polymers of UV curable monomers. The heat curable resins may be polymers of heat curable monomers.

As the base resins of the sealant, for example, acrylate-based resins, epoxy-based resins, urethane-based resins, phenol-based resins, or compounds of these resins. According to an embodiment, the base resins may be acrylate-based resins, and the acrylate-based resins may be polymers of acrylic monomers. For example, the acrylic monomers may be multifunctional acrylate. According to another embodiment, the sealant may include monomer substances in addition to the base resins. For example, the monomer substances may be monofunctional acrylate. In the specification, the monofunctional acrylate may mean compounds having one acryl group, and the multifunctional acrylate may mean compounds having two or more acryl group. The curable resins may be cured by UV irradiation and/or heating. The UV irradiation condition or heat condition may be performed appropriately within the scope that does not damage the objective of the present disclosure. In case of need, the sealant may include initiators, for example, optical initiators or heat initiators.

The sealant may be provided in a method commonly used in the art and, for example, may be formed drawing a sealant at an outer portion of the liquid crystal layer (i.e., inactivate region) with a dispenser having a nozzle. Then, the optical stack of the present disclosure may be manufactured by bonding and curing another optical stack, etc., and curing of the sealant may be performed in an UV irradiation and/or heating method.

In addition to the variable transmittance optical stack, the present disclosure includes a smart window including the same. Furthermore, the present disclosure includes a vehicle in which the smart window is applied to at least one of front windows, rear windows, side windows, sunroof windows, and inner partitions, and a building window including the smart window.

MODE FOR INVENTION

Hereinbelow, an embodiment of the present disclosure will be described in detail. However, the present disclosure may not be limited to embodiments disclosed below and may be implemented in various shapes, and the embodiments merely ensure that the present disclosure is complete and are provided to fully inform those skilled in the art of the scope of the present disclosure, and the present disclosure is defined by the scope of the claims.

Preparation Example: Preparation of Compositions for Forming Coating Layer

Referring to Table 1 described below, compositions for forming the coating layer of preparation examples 1 to 3 were prepared.

TABLE 1

| Content: parts by weight | Preparation example 1 | Preparation example 2 | Preparation example 3 | Comparative preparation example 1 |
|---|---|---|---|---|
| epoxy-based compound[1] | 15 | 15 | 15 | 15 |
| Acryl-based compound[2] | 10 | 10 | 10 | 10 |
| Oxetane-based compound 1[3] | 2 | 2 | 2 | 2 |
| Oxetane-based compound 2[4] | 4 | 4 | 4 | 4 |
| Photopolymerization initiator 1[5] | 1 | 1 | 1 | 1 |
| Photopolymerization initiator 2[6] | 0.4 | 0.4 | 0.4 | 0.4 |
| Leveling agent[7] | 0.1 | 0.1 | 0.1 | 0.1 |
| Nanoparticle dispersion 1[8] | 67.5 | — | — | — |
| Nanoparticle dispersion 2[9] | — | 67.5 | — | — |
| Nanoparticle dispersion 3[10] | — | — | 67.5 | — |

[1] celloxide 2021P (manufactured by Daicel Kagaku)
[2] 1,6-hexanediol diacrylate
[3] OXT-101 (manufactured by Toa Gosei)
[4] OXT-221 (manufactured by Toa Gosei)
[5] CPI-100P (cationic initiator; 50% propylene carbonate solution, manufactured by San-Apro)
[6] 1-hydroxycyclohexylphenylketone (radical initiator; manufactured by BASF)
[7] 8019add (manufactured by Toray Dow Corning)
[8] IPA-ST-L (Nissan Chemicals, particle size 45~50 nm)
[9] IPA-ST (Nissan Chemicals, particle size 10~15 nm)
[10] IPA-ST-ZL (Nissan Chemicals, particle size 70~100 nm)

Examples and Comparative Examples: Formation of Optical Stack

Example 1

The composition for forming the coating layer of Preparation example 1 was applied to an upper surface of the PVA polarizer, and dried and cured to form the coating layer having the thickness of 3 μm. Then, ITO was deposited on an upper surface of the coating layer to form a first stacked member, and a second stacked member was formed in the same manner.

Then, the alignment film and the sealant were provided on an upper surface of the ITO of the first stacked member, and the liquid crystal layer was formed through the liquid crystal injection process, and the liquid crystal layer was coupled to the second stacked member to form the optical stack.

At this point, the liquid crystal layer is driven in the twisted nematic (TN) mode, and adsorption axes of the two different polarizers included in the first and second stacked members are bonded to be aligned perpendicularly to each other.

Example 2

Except for using the composition for forming the coating layer in Preparation example 2 and the coating layer thickness of 5 μm, the optical stack in Example 2 was formed in the same manner as the optical stack in Example 1.

Example 3

Except for using the composition for forming the coating layer in Preparation example 3 and the coating layer thickness of 5 μm, the optical stack in Example 3 was formed in the same manner as the optical stack in Example 1.

Example 4

Except for using the coating layer thickness of 7 μm, the optical stack of Example 4 was formed in the same manner as the optical stack in Example 1.

Example 5

Except for using the coating layer thickness of 11 μm, the optical stack of Example 5 was formed in the same manner as the optical stack in Example 1.

Comparative Example 1

Except for using the composition for forming the coating layer in Comparative Preparation example 1, the optical stack in Comparative example 1 was formed in the same manner as the optical stack in Example 1.

Comparative Example 2

Except that a PET/ITO film was formed by depositing a ITO layer having the thickness of 50 nm on a first surface of a PET film having the thickness of 50 μm, and each of the first and second stacked members was formed by bonding the PVA polarizer on a second surface of the PET film, the optical stack in Comparative example 2 was formed in the same manner as the optical stack in Example 1.

Experimental Examples (1) Adhesion Evaluation

According to the crosscut tape method (JIS K5400 8.5.2 (1990)), adhesion between the coating layer and the polarizer and adhesion between the coating layer and the ITO conductive layer was evaluated.

11 straight lines (width 1 mm) perpendicularly were drawn on a surface of the coating layer or the ITO conductive layer with a knife, and a grid-type evaluation sample with 100 squares (for each, 1 mm×1 mm) was formed. After attaching and removing the cellophane adhesive tape to the surface of the coating layer or the ITO conductive layer, the number of remaining squares was evaluated and shown in Table 2 below.

(2) Light Blocking Performance Evaluation in Light Blocking Mode

After applying voltage to the optical stacks of Examples 1 to 5 and Comparative examples 1 to 2, light blocking performance of each optical stack in the light blocking mode was evaluated.

<Light Blocking Evaluation Criteria>
  ○: Surrounding objects cannot be identified
  Δ: Surrounding objects can be identified, but boundaries are vague
  X: Surrounding objects are clearly identified

TABLE 2

|  | Example | | | | | Comparative example | |
| --- | --- | --- | --- | --- | --- | --- | --- |
|  | 1 | 2 | 3 | 4 | 5 | 1 | 2 |
| Adhesion between the polarizer and the coating layer (%) | 100 | 100 | 100 | 100 | 100 | 100 | — |
| Adhesion between the coating layer and the conductive layer (%) | 100 | 100 | 100 | 100 | 95 | 15 | — |
| Light blocking performance | ○ | ○ | Δ | ○ | ○ | — | X |

Referring to Table 2, it was seen that the optical stacks in Examples 1 to 5 containing nanoparticles are excellent in both of adhesion between the polarizer and the coating layer and adhesion between the coating layer and the conductive layer. On the other hand, the optical stack in Comparative example 1 without nanoparticles has poor adhesion between the coating layer and the conductive layer and cannot be practically used as the optical stack.

Furthermore, all the optical stacks in Examples 1 to 5 have good light blocking performance in the light blocking mode, but the optical stack in Comparative example 2 including a separate PET substrate for forming a conductive layer has poor light blocking performance in the light blocking mode due to phase difference of the PET film.

Furthermore, among the optical stacks in Examples 1 to 5, the optical stacks in Examples 1 to 4 having the coating layer thickness ranging from 3 to 7 μm is more excellent in adhesion between the coating layer and the conductive layer in comparison to the optical stack in Example 5 having the coating layer thickness of 11 μm. Considering the result, the coating layer thickness ranging from 3 to 10 μm has an advantage in adhesion of the coating layer, specifically, adhesion between the coating layer and the conductive layer.

Furthermore, among the optical stacks in Examples 1 to 5, the optical stacks in Examples 1, 2, 4, and 5 having a nanoparticle average diameter ranging from 10 to 50 nm has excellent light blocking performance compared to the optical stack in Example 3 having a nanoparticle average diameter ranging from 70 to 100 nm. Considering the result, a nanoparticle average diameter less than or equal to 50 nm has an advantage in improvement of light blocking performance in the light blocking mode.

INDUSTRIAL APPLICABILITY

According to the present disclosure, the variable transmittance optical stack according to the present disclosure can omit the process of forming a conductive layer on a separate or additional substrate and bonding the conductive layer and other members for forming the conventional optical stack, so that the manufacturing process thereof can be simplified in comparison to the convention optical stack.

The invention claimed is:
1. A variable transmittance optical stack comprising:
   a first polarizing plate;
   a first transparent conductive layer formed on an inner surface of the first polarizing plate;
   a second polarizing plate opposing the first polarizing plate;
   a second transparent conductive layer formed on an inner surface of the second polarizing plate, and opposing the first transparent conductive layer;

a liquid crystal layer provided between the first transparent conductive layer and the second transparent conductive layer; and an alignment film formed on an inner surface of each of the first transparent conductive layer and the second transparent conductive layer, wherein at least one transparent conductive layer of the first transparent conductive layer and the second transparent conductive layer is formed by directly contacting with the first polarizing plate or the second polarizing plate without an additional substrate: between the first polarizing plate and the first transparent conductive layer; or between the second polarizing plate and the second transparent conductive layer, wherein at least one polarizing plate of the first polarizing plate and the second polarizing plate comprises a polarizer and a coating layer provided between the polarizer and at least one of the first transparent conductive layer and the second transparent conductive layer, and wherein the coating layer comprises nanoparticles.

2. The variable transmittance optical stack of claim 1, wherein the nanoparticles comprise silica particles.

3. The variable transmittance optical stack of claim 1, wherein the nanoparticles have particle diameters less than or equal to 50 nm.

4. The variable transmittance optical stack of claim 1, wherein the coating layer has a thickness ranging from 3 to 10 μm.

5. The variable transmittance optical stack of claim 1, wherein at least one of the first transparent conductive layer and the second transparent conductive layer is formed: by directly contacting with the first polarizing plate, with a highly adhesive layer between the first polarizing plate and the first transparent conductive layer; or by directly contacting with the second polarizing plate with the highly adhesive layer between the second polarizing plate and the second transparent conductive layer.

6. The variable transmittance optical stack of claim 1, wherein at least one of the first transparent conductive layer and the second transparent conductive layer comprises one or more types selected from the group consisting of transparent conductive oxide, metal, carbonaceous materials, conductive polymers, conductive ink, and nanowires.

7. The variable transmittance optical stack of claim 1, wherein at least one of the first transparent conductive layer and the second transparent conductive layer has a transmittance of equal to or greater than 50% for visible light.

8. The variable transmittance optical stack of claim 1, wherein at least one of the first polarizing plate and the second polarizing plate comprises at least one of a protective film and an optical functional film.

9. The variable transmittance optical stack of claim 8, wherein the protective film comprises one or more types selected from the group consisting of polyethylene terephthalate, polyethylene isophthalate, polyethylene naphthalate, polybutylene terephthalate, diacetyl cellulose, triacetyl cellulose, polycarbonate, polymethyl acrylate, polymethyl methacrylate, polyethyl acrylate, polyethyl methacrylate, and cyclic olefin polymer.

10. The variable transmittance optical stack of claim 1, wherein at least one polarizing plate of the first polarizing plate and the second polarizing plate has a thickness ranging from 30 μm to 200 μm.

11. The variable transmittance optical stack of claim 1, wherein the liquid crystal layer comprises one or more types selected from the group consisting of a ball spacer and a column spacer.

12. The variable transmittance optical stack of claim 11, wherein the ball spacer has a diameter ranging from 1 μm to 10 μm.

13. The variable transmittance optical stack of claim 11, wherein an occupancy area of the ball spacer in the liquid crystal layer ranges from 0.01% to 10% of the area of the liquid crystal layer.

14. The variable transmittance optical stack of claim 1, further comprising:

a refractive index-matching layer having a refractive index ranging from 1.4 to 2.6.

15. A manufacturing method for the variable transmittance optical stack of claim 1.

16. A smart window comprising the variable transmittance optical stack of claim 1.

17. A vehicle in which the smart window of claim 16 is applied to at least one of a front window, a rear window, a side window, a sunroof window, and an inner partition thereof.

18. Building windows and doors comprising the smart window of claim 16.

* * * * *